United States Patent

Casey

[11] 4,005,616
[45] Feb. 1, 1977

[54] FOOT PEDAL ASSEMBLY WITH A RETURN SPRING

[75] Inventor: Thomas Patrick Casey, Burlington, Iowa

[73] Assignee: J. I. Case Company, Racine, Wis.

[22] Filed: Aug. 11, 1975

[21] Appl. No.: 603,633

[52] U.S. Cl. .................................. 74/512; 74/516; 74/517

[51] Int. Cl.² ......................................... G05G 1/14

[58] Field of Search ............ 74/512, 560, 470, 518, 74/517, 516

[56] References Cited

UNITED STATES PATENTS

| | | | |
|---|---|---|---|
| 3,014,381 | 12/1961 | Frank | 74/512 |
| 3,199,367 | 8/1965 | Zetye | 74/512 |
| 3,861,237 | 1/1975 | Mounts | 74/512 X |
| 3,910,133 | 10/1975 | Oestmann | 74/512 X |
| 3,911,760 | 10/1975 | Elbers et al. | 74/512 |

Primary Examiner—Samuel Scott
Assistant Examiner—F. D. Shoemaker
Attorney, Agent, or Firm—Arthur J. Hansmann

[57] ABSTRACT

A foot pedal assembly with a return spring and having a lever to which the spring is connected and which has a link connected thereto and connected to the foot pedal arm, whereby lesser foot force is required in proportion to the depressing of the pedal itself. The foot pedal is arranged for operating a hydraulic brake of a vehicle.

5 Claims, 1 Drawing Figure

FOOT PEDAL ASSEMBLY WITH A RETURN SPRING

This invention relates to a foot pedal assembly with a return spring, and, more particularly, it has utility in the environment of a vehicle, such as a tractor, where the foot pedal is used for operating the brakes of the vehicle.

BACKGROUND OF THE INVENTION

The prior art already contains many disclosures and teachings of various vehicle brake and accelerator and clutch pedal assemblies, and it is common to have these pedals arranged to be under the influence of a return spring such that when the pedal is depressed the spring is placed under tension, and when the force on the pedal is relieved, the spring will return the pedal to its original position. Examples of such prior art for controls and pedals and the like are found in U.S. Pat. Nos. 2,458,342 and 2,621,538 and 2,900,970. In these patents, there is a disclosure of an arm, such as a foot or hand actuated arm, which has a return spring attached to it so that when the force on the arm is released, the arm will return to its original position and it does so under the influence of the spring. However, in the prior art arrangement, the further the arm is pivoted or moved toward its intended operative position, the greater is the force of the spring which is resisting that movement. Accordingly, much of the operator's effort in moving the arm is expended in overcoming the force of the spring.

The present invention provides a foot pedial assembly which overcomes the aforementioned shortcoming and problem with regard to the prior art, and, specifically it provides a foot pedal assembly with a return spring arranged in the assembly such that the spring force is actually lessened, rather than increased, when the foot pedal is depressed to its operative position. In accomplishing this objective, more of the force exerted by the operator through the foot on the pedal itself is available for actuating the linkage or the hydraulic system or the like which may be connected with the foot pedal, and the entire assembly is therefore considerably more efficient.

Another objective and advantage of the present invention is to accomplish the aforementioned improvement and advantages and to do so with a foot pedal assembly which is sturdy and reliable and which reduces the resisting force of the spring in direct proportion to the amount that the foot pedal itself is depressed and therefore the more the pedal is depressed the greater is the effective force of the operator's foot on the pedal and its attached mechanism.

Specifically, the present invention provides a foot pedal assembly which, compared to the usual design for a vehicle brake pedal, such as that used in a construction or agricultural tractor wherein it is normal to have a seven-pound force applied by the operator's foot to initially move the pedal from its upward or inactive position, and the present invention results in the lesser force of only five pounds required when the pedal is halfway to its fully depressed position, and it requires only two pounds of force when the pedal is to its fully depressed position. Compared to the prior art where the seven-pound foot force is initially required, as mentioned above, the halfway position would require an 11½-pound force and the fully depressed position would require a 16-pound force. Consequently, the present invention requires less force as the pedal is further depressed, and it actually requires 6½ pounds less than the prior art requires at the halfway position and it requires 14 pounds less than the prior art requires at the fully depressed position.

Other objects and advantages will become apparent upon reading the following description in light of the accompanying drawing.

DETAILED DESCRIPTION OF THE PREFERRED EMBODIMENT

Figure 1:
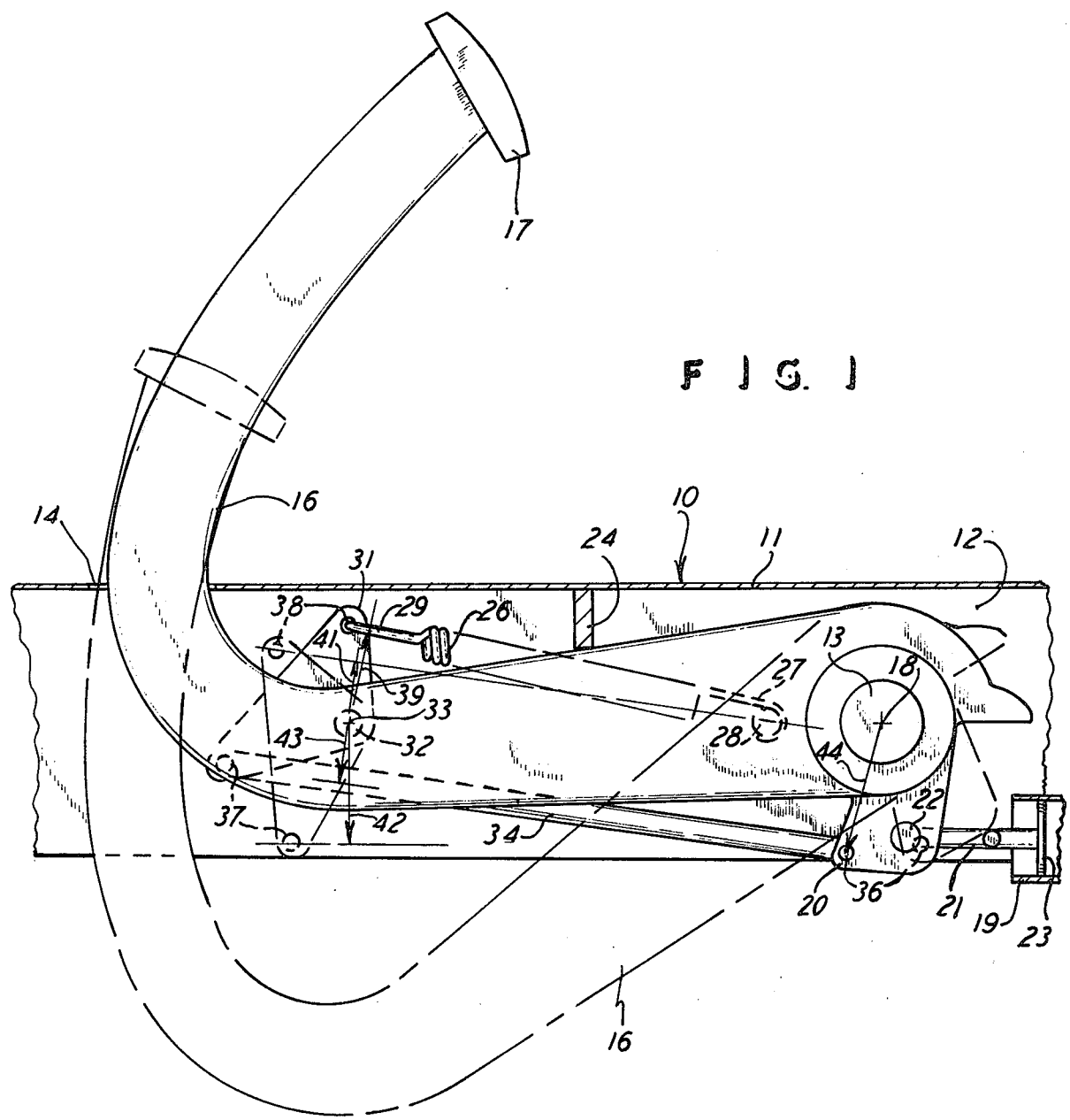
FIG. 1 is a side elevational view of a foot pedal assembly of this invention, and it shows the parts in a depressed position in the dot-dash lines shown thereon.

The drawing shows a support or mounting structure generally designated 10, and this may be a vehicle floor indicated at 11 and it may include a generally uprightly disposed section or wall 12 which suitably supports a pin or shaft 13. The floor 11 is shown to have an opening 14 through which a brake pedal arm 16 extends, and a foot pedal 17 is suitably affixed to the upper end of the arm 16 which is pivotally mounted on the shaft 13 for pivotal movement about the fixed axis 18 of the shaft 13. Thus, the foot pedal 17 and the arm 16 comprise a brake pedal arrangement which is shown in the upper or return position, in full lines, and it is shown in the depressed or lowered position in the dot-dash lines. The arm 16 and foot pedal 17 are arranged as shown and the arm has the curved intermediate length shown and is of course pivotal about the fixed axis 18, in the conventional arrangement and movement of a brake pedal assembly. Also, the arm 16 has a projection 20 which is integral with the arm 16 and thus also moves to the dot-dash position shown, and brake assembly elements, such as the master hydraulic cylinder fragmentarily shown and indicated 19 is suitably connected with the arm projection 20 by means of a rod 21 attached to the projection at the pin 22, for example. Of course the cylinder 19 includes a piston member 23 which, when moved to the right by depressing the pedal 17, the master cylinder 19 can be connected to and thereby energize other cylinders. The other cylinders are not shown, and the connection of the brake elements just described is only by way of example, and the present invention may actually be utilized for actuating other types of foot pedals other than simply brake pedals. Also, in the upper or return position shown in solid lines, the arm 16 abuts a stop 24 which is affixed with the vehicle structure 10 to establish the upward or return limit of pivot of the arm 16, as shown in the solid line position of the arm 16.

A pedal return spring 26 is connected at its one end 27 to a fixed pin 28 which is on the upright member or wall 12, and the spring 26 is shown to be a tension spring having its other end 29 connected with a lever 31 which is pivotally mounted on a pin 32 also affixed to the structure portion 12, in any suitable arrangement. Thus, the lever 31 is pivotal about the pivot axis designated 33 which is the longitudinal axis of the pin 32, and the lever 31 can pivot between the solid line position shown and the dot-dash line shown.

The assembly also includes a link 34 which is pivotally connected to the brake arm by means of a pin 36, for instance, and the link 34 is also pivotally connected to the lever 31 by means of a pin 37, for instance.

With the arrangement described, it will be seen and understood by one skilled in the art that the spring 26 will urge the lever 31 clockwise about the pivot axis 33 to the limit position shown by the solid lines in the drawing, and this is the return position as described. Further, when the pedal 17 is depressed by the operator, the pedal 17 and the arm 16 can move to the dot-dash position shown, and the arm projection 20 will also move to its dot-dash position shown and that movement will displace the link 34 to the right, as viewed in the drawing, and such displacement will cause the lever 31 to pivot in the counterclockwise direction about its pivot axis 33. In that movement, the spring 26 is extended since its point of connection with the lever 31 and designated 38 moves away from the attachment pin 28 to thereby extend the spring 26 and cause it to exert a greater force on the lever 31 in the clockwise direction. However, by virtue of the configuration and location of the lever 31, and by virtue of the attachment points 37 and 38 of the link 34 and spring 26, respectively, on the lever 31, the force of the spring 26 tending to rotate the lever 31 clockwise is actually less effective in the pedal depressed position, and thus lesser force is required from the operator in order to apply the brakes or depress the pedal 17.

Specifically, the reason for the requirement of a lesser force is the fact that the link 34 pivots the lever 31 counter-clockwise and thereby reduces the moment arm designated 39 to the length of the moment arm designated 41. Thus, the moment arms 39 and 41 are the arms measured from the pivot axis 33 to the right angle intersection with the length of the spring 26, and thus there is less torque on the lever 31 by virtue of the shorter moment arm 41, when the pedal is depressed, and thus there is less effect of the spring 26 tending to resist the depressing of the pedal 17.

Simultaneously with the above, the connection point or pin 37 moves to a position which provides a greater moment arm designated 42 and extending from the pivot axis 33 to the right angle intersection with the line or axis between the link connection points 37 and 36, as will be seen and understood by one skilled in the art. Therefore, the depressing of the pedal and the consequent force in pulling on the link 34 is more and more effective, due to the increase in the moment arm from the original length designated 43 and to the final length designated 42, and thus greater force is applied in rotating the lever 31 counter-clockwise while the pedal is being depressed, and therefore the force of the spring 26 on the lever 31 can be more easily overcome. For these reasons, the further the pedal 17 is depressed the lesser force needs to be applied by the operator.

Still further, the connection point 36 in its return or solid line position is substantially on a line extending at a right angle to the longitudinal axis of the link 34 and with that right angle line extending through the pivot axis 18 and being indicated by the line designated 44. Also, the shifted position of the pin 36, as indicated by the dot-dash lines, dues not substantially reduce the moment arm designated as the line 44, and thus the force of the arm projection 20 on the link 34 while the pedal is being depressed is substantially continuously fully effective for pivoting the lever 31, as described above. It will therefore also be seen and understood that the lever 31 is in the form of a bell-crank having its two opposite ends respectively presenting the connection locations or elements designated 37 and 38, as described, and those ends are of course on opposite sides of the pivot axis 33. Likewise, the connection point 22 moves only a very small amount around the fixed axis 18, as is similar with the connection pin or point 36 as described, and thus the force applied by the operator on the pedal 17 is not substantially diminished in its transmission to the connection point 22 and the connecting piston rod 21 since again the moment arm from the axis 18 to the connecting pin 22 remains substantially the same in the depressed or shifted position shown.

Likewise, the effective force of the spring 26 on the lever 31 in the return or solid line position shown creates the greatest effective force of the rod 34 on the arm 16 to thus hold the pedal in the raised position against the stop 24, and avoid rattling and movement of the raised pedal. This is true because of the respectively longer and shorter moment arms 39 and 43, both tending to hold the lever 31 in its full line position and against any tendency for the brake arm 16 to pivot downwardly. It will also be noticed that the fixed axis 18 and the pivot axis 33 can be considered to define a plane with the spring connection 38 at one side of the plane and with the connection 37 at the other side of the plane, and of course the axes 18 and 33 are parallel to each other. Also, the connections at 36 and 37 for the rod 34 may be rod ends 36 and 37 offset at right angles to the length of the rod 34 and extending into an openinng in projection 18 and lever 31, respectively.

What is claimed is:

1. A foot pedal assembly with a return spring, comprising a foot pedal having a pivotally mounted arm pivotal relative to a fixed axis for pivotal movement of said foot pedal between a depressed position and a return position, a lever pivotally mounted adjacent said arm and having a pivot axis and two ends disposed on opposite sides of said pivot axis, a longitudinal link interconnected with one of said two ends of said lever and with said arm for pivoting said lever in accordance with and in response to pivotal movement of said foot pedal and to have said lever pivot in one direction when said pedal is depressed, and a longitudinal return spring connected with the other end of said two ends of said lever for yieldingly urging said link in the direction to pivot said foot pedal to its said return position, the location of the connection of said spring with said lever is related to said pivot axis of said lever with said connection of said link being located in the said one direction of pivot of said lever and from the plane along the shortest line from said pivot axis to the longitudinal center line of said spring, and with the location of the connection of said link with said lever being related to said pivot axis of said lever with said connection of said link being located against the said one direction of pivot of said lever and from the plane along the shortest line from said pivot axis to the longitudinal center line of said link, and with said connections being so located that the moment arm of said link and said spring relative to said lever respectively increase and decrease in accordance with pivotal movement of said foot pedal toward its said depressed position.

2. The foot pedal assembly with a return spring as claimed in claim 1, wherein said link is connected with said arm at a location on said arm to present substantially a right angle intersection between the longitudinal axis of said link and a line between said fixed axis and the said location of the connection of said link with said arm.

3. The foot pedal assembly with a return spring as claimed in claim 1, including a hydraulic cylinder assembly connected with said arm to be actuated in response to depressing said foot pedal.

4. The foot pedal assembly with a return spring as claimed in claim 1, wherein said fixed axis of said arm and said pivot axis of said lever are disposed parallel to each other, and said link is disposed to one side of the plane between said axes and said spring is disposed to the other side of said plane.

5. The foot pedal assembly with a return spring as claimed in claim 1, including a stop disposed adjacent said arm for abutting said arm in said return position and thereby stop pivotal movement of said arm under the influence of said spring.

* * * * *